(12) United States Patent
Marupaduga

(10) Patent No.: US 11,595,969 B1
(45) Date of Patent: Feb. 28, 2023

(54) ALLOCATING AIR INTERFACE RESOURCES TO RELAY NODES IN HETEROGENEOUS NETWORKS

(71) Applicant: Sprint Spectrum LP, Overland Park, KS (US)

(72) Inventor: Sreekar Marupaduga, Overland Park, KS (US)

(73) Assignee: Sprint Spectrum LP, Overland Park, KS (US)

( * ) Notice: Subject to any disclaimer, the term of this patent is extended or adjusted under 35 U.S.C. 154(b) by 0 days.

(21) Appl. No.: 16/985,730

(22) Filed: Aug. 5, 2020

(51) Int. Cl.
*H04W 72/10* (2009.01)
*H04W 16/32* (2009.01)
*H04W 72/04* (2023.01)

(52) U.S. Cl.
CPC ........... *H04W 72/10* (2013.01); *H04W 16/32* (2013.01); *H04W 72/0433* (2013.01)

(58) Field of Classification Search
CPC .. H04W 72/10; H04W 16/32; H04W 72/0433
See application file for complete search history.

(56) References Cited

U.S. PATENT DOCUMENTS

| | | | |
|---|---|---|---|
| 10,638,505 B1 | 4/2020 | Manchanda et al. | |
| 2020/0008127 A1* | 1/2020 | Ohtsuji | H04W 40/22 |
| 2020/0154287 A1* | 5/2020 | Novlan | H04W 36/0088 |
| 2021/0014768 A1* | 1/2021 | Hong | H04W 72/04 |
| 2021/0120469 A1* | 4/2021 | Yuan | H04B 7/14 |

* cited by examiner

*Primary Examiner* — Mazda Sabouri
(74) *Attorney, Agent, or Firm* — Jones Robb, PLLC

(57) ABSTRACT

Prioritizing resource allocation for relay nodes that have higher bandwidth capabilities, such as 5G EN-DC, versus other relay nodes that do not have such capabilities. The bandwidth capability can be based on a channel bandwidth allocation for different relay nodes, with the assumption that 5G or higher relay nodes will be able to utilize higher bandwidth channels.

16 Claims, 9 Drawing Sheets

RECEIVE RESOURCE REQUESTS FROM FIRST AND SECOND RELAY NODE AT DONOR ACCESS NODE
810

PREFERENTIALLY ALLOCATE AIR INTERFACE RESOURCES TO RELAY NODE WITH HIGHER BANDWIDTH CAPABILITY
820

ALLOCATING AIR INTERFACE RESOURCES TO RELAY NODES IN HETEROGENEOUS NETWORKS

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mm-wave) networks, as well as older legacy networks. In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT. There are various potential deployments of EN-DC, such as one-to-one (where a 4G eNodeB is colocated with a 5G gNodeB at the same cell site or radio access network), or one-to-many (where a 4G eNodeB at a first radio access network is coupled via X2 links to many different 5G gNodeBs, each within their own radio access network or cell site). Each radio access network (RAN) or cell site can further include a cell site router, which provides connectivity to other network elements, such as an intermediate or core network. The connection between the cell site router and other network elements closer to the core network may be referred to as a mobile backhaul.

Further, as wireless device technology improves, relay nodes are being deployed to improve service quality by relaying communication between an access node, and wireless devices in the wireless network. For example, relay nodes may be used at the edge of a coverage area of an access node to improve coverage and/or service, as well as in crowded areas having a high number of other wireless devices to increase the available throughput to the wireless devices being relayed. Relay nodes are generally configured to communicate with the serving access node (i.e. a "donor" access node) via a wireless connection, and to deploy a wireless air interface to which end-user wireless devices can attach. Relay nodes can include a combination of a relay wireless device physically coupled to a relay access point (AP). The relay wireless device provides the wireless connection between the AP and the donor access node, and such a wireless connection may be referred to as a wireless backhaul. Meanwhile the relay AP deploys the wireless air interface to which end-user wireless devices can attach. The relay wireless device can include a 5G-capable wireless device, thereby being able to avail of the aforementioned dual connectivity or EN-DC for a more robust wireless backhaul.

However, transitioning to these advanced technologies in today's heterogenous wireless networks can be associated with problems. In particular, since relay nodes serve increasing numbers of wireless devices, it must be ensured that the relay nodes themselves are provided with a high quality wireless backhaul, that is, the wireless connection between the relay node and the donor access node. Such considerations are further complicated in heterogeneous networks with various relay nodes having different capabilities, e.g. 5G relay nodes and 4G relay nodes. For example, a donor access node having a loaded wireless air interface may be unable to allocate resources for multiple relay nodes and, therefore, the service quality for the end-user wireless devices attached to the relay nodes can suffer.

Overview

Exemplary embodiments described herein include methods, systems, and processing nodes for allocating wireless air interface resources for relay nodes in heterogeneous networks based on a capability of the relay nodes.

An exemplary method for allocating air interface resources to relay nodes in heterogeneous networks includes identifying two or more relay nodes within range of a donor access node, and preferentially allocating air interface resources to the two or more relay nodes based on a bandwidth capability of each relay node. The bandwidth capability can be associated with a capability of each relay node to participate in 4G LTE, 5G NR, or any other radio access technology (RAT).

Another exemplary method for allocating air interface resources to relay nodes in heterogeneous networks includes receiving a first resource request from a first relay node, receiving a second resource request from a second relay node, and preferentially allocating air interface resources to one of the first or second relay nodes based on a bandwidth capability of each relay node.

Another exemplary method for allocating air interface resources to relay nodes in heterogeneous networks includes determining that a first relay node within range of a donor access node is capable of utilizing a higher bandwidth than a second relay node within range of the donor access node, and preferentially allocating air interface resources to the first relay node over the second relay node.

Another method for allocating air interface resources to relay nodes in heterogeneous networks includes identifying a 5G-capable relay node within range of a donor access node, identifying a 4G-capable relay node within range of the donor access node, and preferentially allocating air interface resources to the 5G-capable relay node.

The exemplary embodiments described herein may be performed by a processing node within a system, such as a telecommunication system. For example, an exemplary system for allocating air interface resources to relay nodes in heterogeneous networks includes a donor access node configured to deploy at least a 4G wireless air interface and a 5G wireless air interface, and a processing node communicatively coupled to the donor access node. The processing node can be configured to perform operations including identifying two or more relay nodes within range of a donor access node, and preferentially allocating air interface resources to the two or more relay nodes based on a bandwidth capability of each relay node. The bandwidth capability can be associated with a capability of each relay node to participate in 4G LTE, 5G NR, or any other radio access technology (RAT).

In another exemplary embodiment, the processing node can be configured to perform operations including identifying a 5G-capable relay node within range of a donor access node, identifying a 4G-capable relay node within range of the donor access node, and preferentially allocating air interface resources to the 5G-capable relay node.

Another exemplary system for allocating air interface resources to relay nodes in heterogeneous networks can include a donor access node, a first relay node configured to utilize a first channel bandwidth, a second relay node configured to utilize a second channel bandwidth, the second channel bandwidth being smaller than the first channel bandwidth, and a processing node communicatively coupled to the donor access node. The processing node can be configured to perform any of the above operations in various combinations.

DETAILED DESCRIPTION

Figure 1:
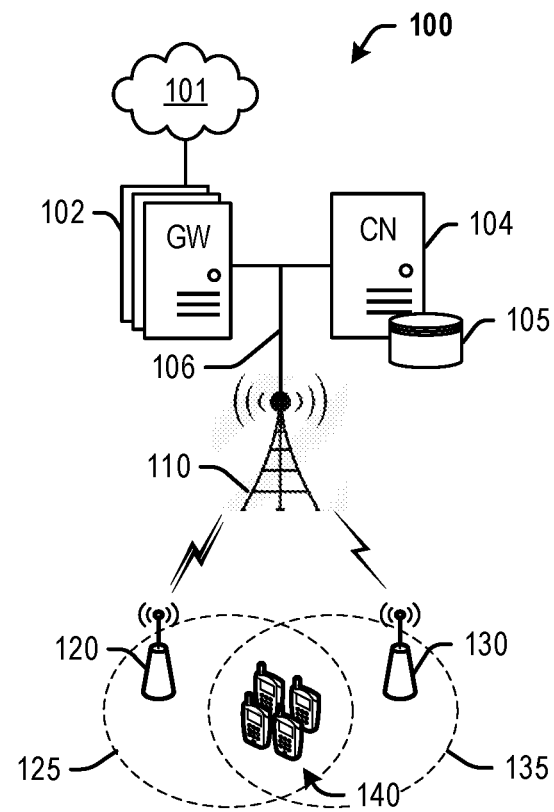
FIG. 1 depicts an exemplary system for allocating air interface resources to relay nodes in heterogeneous networks.

The following disclosure provides methods and systems for prioritizing resource allocation for relay nodes that have specific capabilities, e.g. capability for using a higher-bandwidth channel, such as 5G EN-DC, versus other relay nodes that do not have such capabilities. In particular when the donor access node in a heterogeneous network is loaded (i.e. has limited wireless air interface resources available), preferentially allocating resources to more capable relay nodes ensures quality of service for end-user wireless devices attached to the more capable relay nodes. The bandwidth capability can be based on a channel bandwidth allocation for different relay nodes, with the assumption that 5G or higher relay nodes will be able to utilize higher bandwidth channels. Resource grant allocations, such as uplink grant allocations, can be prioritized for the 5G-capable relay nodes over other relay nodes. The relay nodes (and capabilities thereof) can be identified based on a quality of service class identifier (QCI), a public land mobile identifier (PLMN) assignment, or equivalent attributes.

Exemplary heterogeneous wireless networks described herein include donor access nodes and relay nodes that are capable of communicating using a plurality of wireless air interfaces or RATs. For example, a donor access node can include a combination of a 4G eNodeB and a 5G gNodeB. In other words, the access node can be configured to communicate using 4G LTE as well using 5G NR. In some embodiments, the donor access node can include a 4G eNodeB coupled to a plurality of 5G gNodeBs (one-to-many configuration). In similar embodiments, the donor access nodes can be selected from either the eNodeB or one of the 5G gNodeBs. Thus, as further described herein, the donor access nodes can be part of the same or different cell sites or radio access networks (RANs), each RAN being served by a different cell site router. Further, multiple relay nodes with different capabilities may serve common geographical areas. For example, a 4G-capable relay node and a 5G-capable relay node within a geographic location may be available to the same end-user wireless devices, and served by the same donor access node. The relay nodes may utilize the same RAT while being capable of utilizing different bandwidths.

Therefore, a method as described herein for allocating air interface resources to relay nodes in heterogeneous networks includes identifying two or more relay nodes within range of a donor access node, and preferentially allocating air interface resources to the two or more relay nodes based on a bandwidth capability of each relay node. The bandwidth capability can be associated with a capability of each relay node to participate in 4G LTE, 5G NR, or any other radio access technology (RAT). As described herein, the relay nodes may serve a common coverage area. Further identifying further comprises receiving a resource request from each relay node, and/or parsing attributes of each relay node, such as a QCI, primary cell identifier (PCI), PLMN ID, etc. Thus, upon receiving a first resource request from a first relay node and a second resource request from a second relay node, air interface resources are preferentially allocated to one of the first or second relay nodes based on a bandwidth capability of each relay node.

Further described herein are different radio access network (RAN) configurations for EN-DC capable donor access nodes, with each RAN configuration enabling participation in dual-connectivity using at least two RATs, and variations on which component of the different RANs performs the preferential allocation of resources. Exemplary donor access nodes described herein include schedulers that are configured to perform control resource allocations, data resource allocations, or both, and coupled to different types of donor access nodes including eNodeBs, gNodeBs, etc. For example, each donor access node can include a primary access node configured to deploy carriers utilizing a first RAT, and the primary access node is coupled to one or more secondary access nodes, each secondary access node configured to deploy carriers utilizing a second RAT. Alternatively, each donor access node comprises a secondary access node configured to deploy carriers utilizing the second RAT, the secondary access node being coupled to a primary access node configured to deploy carriers utilizing the first RAT.

Thus, exemplary systems described herein for allocating air interface resources to relay nodes in heterogeneous networks include one or more donor access nodes configured to deploy at least a 4G wireless air interface and a 5G wireless air interface, and a processing node communicatively coupled to the donor access node(s). The processing node can be configured to perform any of the above operations in various combinations. These and other embodiments are further described herein and with reference to FIGS. 1-11.

FIG. 1 depicts an exemplary system 100 comprising a communication network 101, gateway 102, controller node 104, access node 110, relay nodes 120, 130, and wireless devices 140. In this exemplary embodiment, access node 110 may be macrocell access nodes configured to deploy wireless air interfaces to which relay nodes 120, 130 (and other wireless devices not shown herein) can attach and access network services from network 101. Relay nodes 120, 130 may be configured to communicate with access node 110 over communication links referred to as wireless backhaul, and are further configured to deploy additional wireless air-interfaces 125, 135 to which wireless devices 140 can attach. Relay nodes 120, 130 are thus configured to relay data between a donor access node 110 and wireless devices 140, such that wireless devices 140 may access network services using any one of relay nodes 120, 130 rather than overload donor access node 110 (which may be serving numerous other devices not shown herein). Moreover, wireless devices that are outside a coverage area of access node 110 may access network services from donor access node 110 by virtue of being connected to one of relay nodes 120, 130. Although only access node 110, relay nodes 120, 130, and end-user wireless devices 140 are illustrated in FIG. 1, system 100 can include various other combinations of carriers/wireless air interfaces, antenna elements, access nodes, and wireless devices, as may be evident to those having ordinary skill in the art in light of this disclosure.

Further, access node 110 may be configured to deploy at least two wireless air interfaces using dual connectivity. For example, access node 110 can include a combination of an eNodeB and a gNodeB, such that each access node is be configured to deploy a wireless air interface using a first RAT (e.g. 4G LTE) and a second RAT (e.g. 5G NR). Each RAT can be configured to utilize a different frequency band or sub-band, a different channel size or bandwidth, and so on. For example, the 5G NR wireless air interface can be configured to utilize higher frequencies and larger channel bandwidths than the 4G LTE wireless air interface. Further, access node 110 can be configured to communicate using both RATs at the same time. For example, dual connections can be set up with one or both of relay nodes 120, 130 using both 4G and 5G wireless air interfaces, with the 4G wireless air interface being used to transmit control information, and the 5G wireless air interface being used to transmit data information. In this exemplary embodiment, relay node 120 is illustrated as being capable of communication with access node 110 using both 4G and 5G wireless air interfaces, while relay node 130 is illustrated as being capable of communication using just one wireless air interface (e.g. 4G).

Thus, a processing node within system 100 (for example, communicatively coupled to access node 110 or any other network node) can be configured to determine whether or not each relay node 120, 130 is capable of dual connectivity and/or communication using 5G NR, and instruct the donor access node 110 to broadcast an indicator in, for example, a system information message. Responsive to the indicator, relay nodes 120, 130 can attach to donor access node 110 using the 4G wireless air interface to control and set up a dual connectivity session. In other words, control information (including SIB messages) is transmitted using the 4G LTE wireless air interface, while the 5G NR wireless air interface is utilized for transmission of data. Using the 5G RAT for data transmissions is advantageous, as 5G provides higher bandwidths and frequencies versus 4G.

In an exemplary embodiment, the processing node is further is configured to perform operations for allocating air interface resources to relay nodes 120, 130 by identifying relay nodes 120, 130 as being within range of donor access node 110, and preferentially allocating air interface resources to the relay nodes 120, 130 based on a bandwidth capability of each relay node 120, 130. The bandwidth capability can be associated with a capability of each relay node 120, 130 to participate in 4G LTE, 5G NR, or any other radio access technology (RAT). As described herein, the relay nodes 120, 130 may serve a common coverage area, in which wireless devices 140 are located. Identifying relay nodes 120, 130 further comprises receiving a resource request from each relay node 120, 130, and/or parsing attributes of each relay node, such as a QCI, primary cell identifier (PCI), PLMN ID, etc. Thus, upon receiving a first resource request from relay node 120 and a second resource request from relay node 130, air interface resources can be preferentially allocated to relay node 120 based on the higher bandwidth capability of relay node 120 relative to the lower bandwidth capability of relay node 130. Various other combinations of these operations may be envisioned by those having ordinary skill in the art in light of this disclosure.

Access node 110 can be any network node configured to provide communication between relay nodes 120, 130 (and end-user wireless devices 140 attached thereto) and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area in the range of approximately five kilometers to thirty-five kilometers and an output power in the tens of watts. Alternatively, access node 110 may comprise any short range, low power, small-cell access node such as a microcell access node, a picocell access node, a femtocell access node, or a home eNodeB/gNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with each other, and other access nodes (not shown), using a wireless link or a wired link such as an X2 link. Components of exemplary access node 110 and processing nodes coupled thereto are further described with reference to FIGS. 2-3.

Wireless device 140 may be any device, system, combination of devices, or other such communication platform capable of communicating wirelessly with relay nodes 120, 130 and/or access node 110 using one or more frequency bands deployed therefrom. Wireless devices 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 140. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication link 106 can be direct links or might include various equipment, intermediate components, systems, and networks, such as a cell site router, etc. Communication link 106 may comprise many different signals sharing the same link. Communication link 106 may be associated with many different reference points, such as N1-Nxx, as well as S1-Sxx, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW), a public data network gateway (PGW), and/or a systems architecture evolution gateway (SAE-GW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a control gateway (SGW-C or PGW-C), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as capabilities of relay nodes 120, 130, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to:

access node 110, relay nodes 120, 130, gateway(s) 102, controller node 104, and/or network 101.

Figure 2:
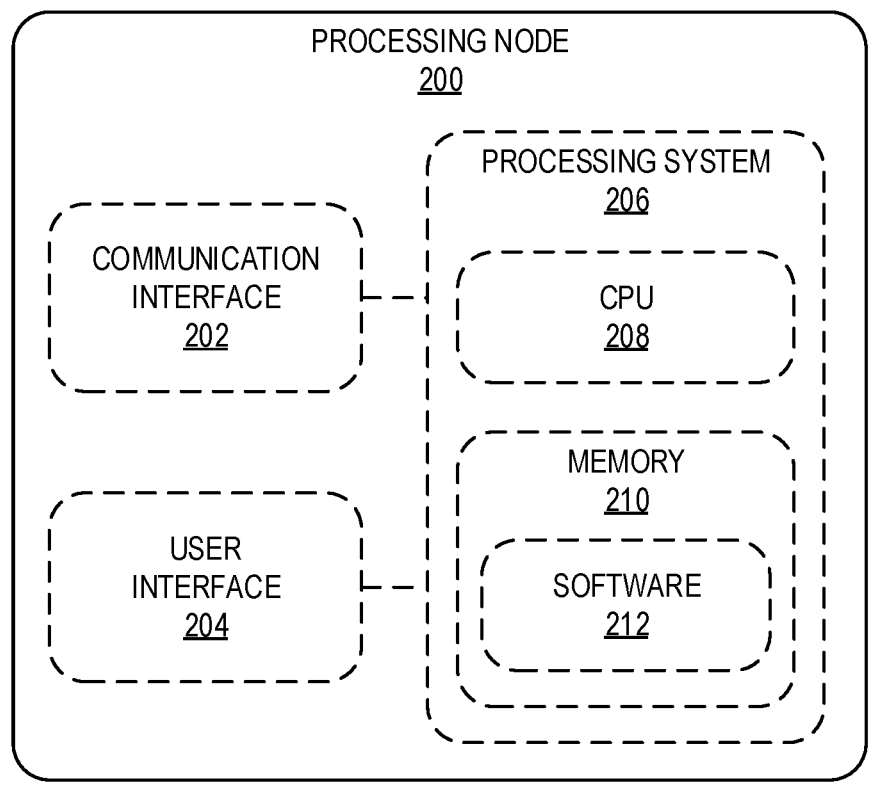
FIG. 2 depicts an exemplary processing node for allocating air interface resources to relay nodes in heterogeneous networks.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Further, memory 210 can store a software 212, which may be executed to perform the operations described herein. In an exemplary embodiment, software 212 can include instructions for allocating air interface resources to relay nodes in heterogeneous networks by identifying two or more relay nodes within range of a donor access node, and preferentially allocating air interface resources to the two or more relay nodes based on a bandwidth capability of each relay node. The bandwidth capability can be associated with a capability of each relay node to participate in 4G LTE, 5G NR, or any other radio access technology (RAT). In an exemplary embodiment, software 212 can include instructions for allocating air interface resources to relay nodes in heterogeneous networks by receiving a first resource request from a first relay node, receiving a second resource request from a second relay node, and preferentially allocating air interface resources to one of the first or second relay nodes based on a bandwidth capability of each relay node. In an exemplary embodiment, software 212 can include instructions for allocating air interface resources to relay nodes in heterogeneous networks by determining that a first relay node within range of a donor access node is capable of utilizing a higher bandwidth than a second relay node within range of the donor access node, and preferentially allocating air interface resources to the first relay node over the second relay node. In an exemplary embodiment, software 212 can include instructions for allocating air interface resources to relay nodes in heterogeneous networks by identifying a 5G-capable relay node within range of a donor access node, identifying a 4G-capable relay node within range of the donor access node, and preferentially allocating air interface resources to the 5G-capable relay node.

Figure 3:
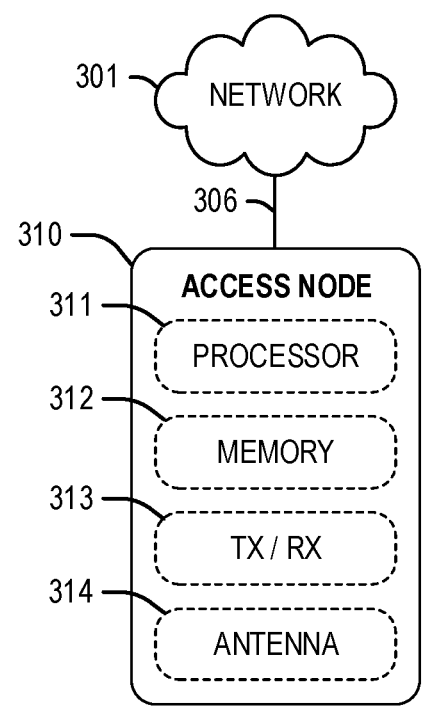
FIG. 3 depicts an exemplary access node for allocating air interface resources to relay nodes in heterogeneous networks.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, a transceiver 313, and antennae 314 (hereinafter referred to as antenna elements 314). Processor 311 executes instructions stored on memory 312, and transceiver 313 (in conjunction with antenna elements 314) enable wireless communication respectively at least two wireless air interfaces, such as 4G LTE and 5G NR. For example, access node 310 may be configured to transmit control information using a first set of antennae elements 314 configured to utilize a 4G LTE interface, and data information using a second set of antennae elements 314 configured to utilize a 5G NR air interface. Alternatively or in addition, each separate air interface maintains its own control and data transmissions. Further, antenna elements 314 may include an array of antenna elements that are configured to deploy air interfaces over one or more wireless sectors, form beams within these sectors, employ multiple-input-multiple-output (MIMO), etc.

In an exemplary embodiment, memory 312 can store instructions for allocating air interface resources to relay nodes in heterogeneous networks by identifying two or more relay nodes within range of access node 310 (hereinafter "donor access node"), and preferentially allocating air interface resources to the two or more relay nodes based on a bandwidth capability of each relay node. The bandwidth capability can be associated with a capability of each relay node to participate in 4G LTE, 5G NR, or any other radio access technology (RAT). In an exemplary embodiment, memory 312 can include instructions for allocating air interface resources to relay nodes in heterogeneous networks by receiving a first resource request from a first relay node, receiving a second resource request from a second relay node, and preferentially allocating air interface resources to one of the first or second relay nodes based on a bandwidth capability of each relay node. In an exemplary embodiment, memory 312 can include instructions for allocating air interface resources to relay nodes in heterogeneous networks by determining that a first relay node within range of donor access node 310 is capable of utilizing a higher bandwidth than a second relay node within range of the donor access node 310, and preferentially allocating air interface resources to the first relay node over the second relay node. In an exemplary embodiment, memory 312 can include instructions for allocating air interface resources to relay nodes in heterogeneous networks by identifying a 5G-capable relay node within range of donor access node 310, identifying a 4G-capable relay node within range of the donor access node 310, and preferentially allocating air interface resources to the 5G-capable relay node. These instructions may further be performed by a scheduler stored on memory 312.

Figure 4:
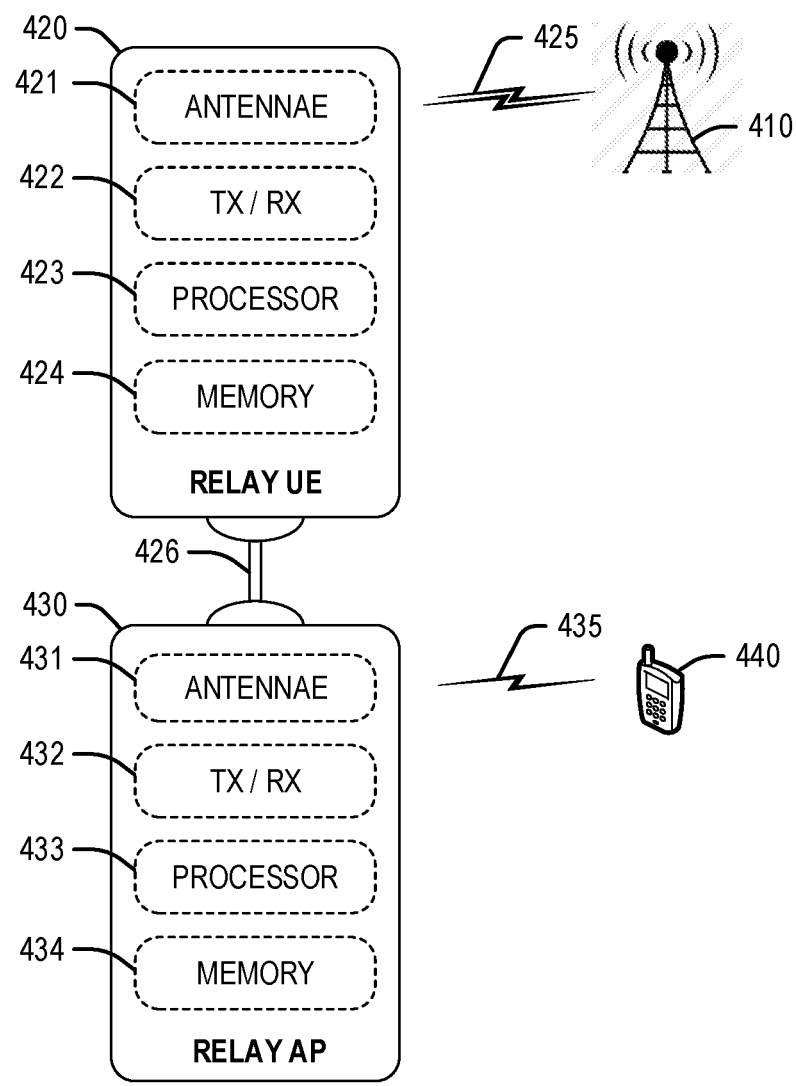
FIG. 4 depicts an exemplary relay node.

FIG. 4 depicts an exemplary relay node comprising a relay wireless device (UE) 420 and a relay access point (AP) 430. Relay wireless device 420 is illustrated as comprising an antenna 421 for direct (i.e. unrelayed) communication with donor access node 410 via wireless backhaul link 425, a transceiver 422, a processor 423, and a memory 424 for storing instructions that enable relay wireless device 420 to perform operations described herein. In some embodiments, relay wireless device 420 is referred to as a customer premise equipment (CPE), which includes any stationary LTE wireless device having a stronger computational & RF capability versus standard wireless devices, as well as a directional antenna and a dedicated power supply, enabling relay wireless device 420 to efficiently provide resources to wireless device 440 via relay access point 430. Consequently, relay access point 430 may be co-located with relay wireless device 420, and is connected to relay wireless device 420 via a communication interface 426. Communication interface 426 may be any interface that enables direct communication between relay wireless device 420 and relay access point 430, such as USB, FireWire, Ethernet, or any other serial, parallel, analog, or digital interface. Transceivers 422 can include transceivers capable of dual connectivity. For example, transceivers 422 can include a combination of transceivers capable of communicating via 4G LTE and 5G NR simultaneously. Antennae 421 can be similarly enabled for 5G EN-DC transmissions.

In operation, relay wireless device 420 may be configured to relay network services from donor access node 410 to wireless device 440 via relay access point 430. Relay wireless device 420 may begin to function as a relay wireless device by sending a message to donor access node 410 to indicate to donor access node 410 that wireless device 420 is functioning as a relay wireless device. In some embodiments, relay wireless device 420 can request to send a buffer status report to donor access node 410. Donor access node 410 can grant this request in a conventional manner. Relay wireless device 420 may respond to the grant by sending a short buffer status report. This short buffer status report is associated with a logical channel group that indicates the buffer status report is communicating the status of relay wireless device 420 as a relay, and thus is not asking for additional resource allocations (like a 'conventional' buffer status report would indicate). In other words, when relay wireless device 420 responds with a buffer status report for the 'special' logical channel group, it means that the buffer status report is not actually reporting the status of a buffer. Rather, this buffer status report indicates that the wireless device is now functioning as a relay. Once status of relay wireless device 420 is established, relay wireless device 420 may instruct relay access point 430 to start accepting connection requests from one or more wireless devices such as wireless device 440. Further, based on the indication of relay status, donor access node 410 may alter how relay wireless device 420 is treated. For example, relay wireless device 420 may be provided with preferential treatment because it is functioning as a relay. Further, memory 424 can include instructions for transmitting an identifier of relay UE 420 to donor access node 410, such as a QCI, PCI, or PLMN ID, enabling donor access node 410 to perform the resource allocation operations described herein for 5G EN-DC capable relay nodes.

Relay access point 430 is illustrated as comprising an antenna 431 and transceiver 432 for enabling communication with wireless device 440, processor 433, and a memory 434 for storing instructions that are executed by processor 433. In some embodiments, relay access point 430 may be a home eNodeB. Moreover, although only one transceiver is depicted in each of relay wireless device 420 and relay access point 430, additional transceivers may be incorporated in order to facilitate communication across interface 426 and other network elements.

Figure 5:
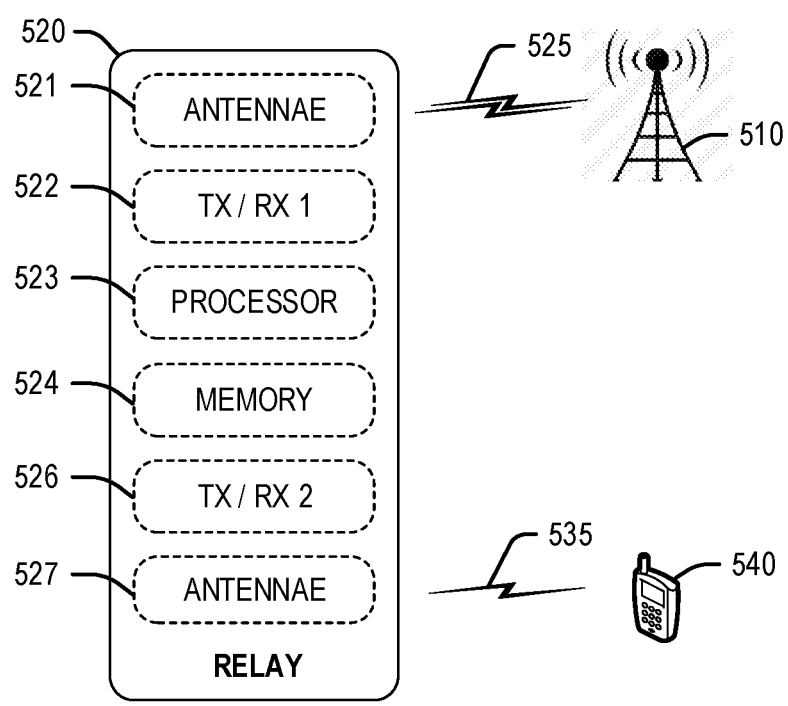
FIG. 5 depicts another exemplary relay node.

In another exemplary embodiment, the relay node may integrate components of a relay wireless device and a relay access point into a single unit. FIG. 5 depicts such an exemplary relay node 520. Relay node 520 is illustrated as comprising an antenna 521 for direct (i.e. unrelayed) communication with donor access node 510 via wireless backhaul link 525, a transceiver 522, a processor 523, and a memory 524 for storing instructions that are executed by processor 522 as described herein. Relay node 520 further includes another transceiver 526 and antenna 527 for enabling communication with wireless device 540. Relay node 520 can perform operations similar to those described with respect to FIG. 4.

In an embodiment, the relay nodes depicted in FIG. 4-5 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to wireless devices. Likewise, RF signals received from wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay node also performs a decode and forward function. However, a layer 3 relay node also performs additional processing (such as ciphering and/or data concatenation/segmentation/resassembly). In other words, relay node depicted herein performs demodulation and decoding of the received RF signals (either uplink or downlink), processes received data, then encodes, modulates, and transmits the data to a wireless device.

Figure 6:
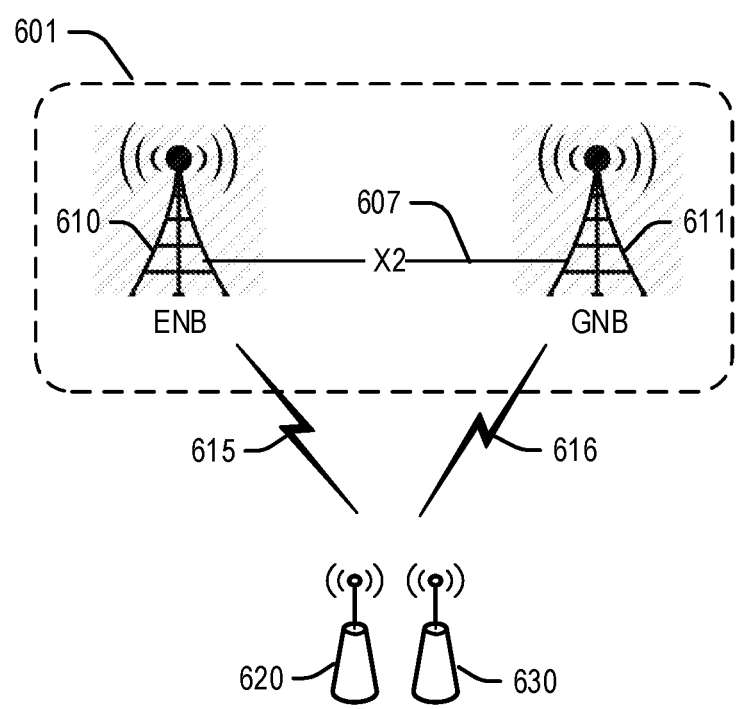
FIG. 6 depicts preferential resource allocation for relay nodes in an exemplary 5G EN-DC radio access network.

FIG. 6 depicts exemplary resource allocation for relay nodes in a 5G EN-DC radio access network (RAN) 601. RAN 601 includes colocated access nodes 610, 611, and may include other components not shown herein for convenience, such as cell site routers, controllers, etc. Further, RAN 601 may be connected to other intermediate or core networks. In this exemplary embodiment, access node 610 can include a eNodeB, and access node 611 can include a gNodeB. For example, access node 610 can be configured to deploy a wireless interface 615 using a first radio access technology (RAT), e.g. 4G LTE, and access node 611 can be configured to deploy a second wireless interface 616 using a second RAT, e.g. 5G NR. Each RAT can be configured to utilize a different frequency band or sub-band, a different channel size or bandwidth, and so on. For example, the 5G NR wireless interface 616 can be configured to utilize higher frequencies and larger channel bandwidths than the 4G LTE wireless interface 615.

Further, access nodes 610, 611 can be configured to communicate using both RATs at the same time. For example, dual connections can be set up with any of relay nodes 620, 630 using both 4G and 5G air interfaces 615, 625 respectively, the 4G wireless interface 615 being used to transmit control information, and the 5G wireless interface 616 being used to transmit data information. For example, a processing node within RAN 601 (for example, communicatively coupled to access nodes 610, 611, or any other network node) can be configured to determine whether or not relay nodes 620, 630 are capable of communicating using both RATs (e.g. capable of 5G EN-DC), and instruct the access node 610 to broadcast an indicator in, for example, a system information message. Responsive to the indicator, relay nodes 620, 630 can attach to access node 610 which can use the 4G carrier to control and set up a dual connectivity session with the relay node 620, 630. In other words, control information (including SIB messages) is transmitted from the access node 610 using the 4G LTE air interface, while the 5G NR air interface is utilized for transmission of data via access node 611. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth.

Further, within radio access network 602, access nodes 610 and 611 can be coupled via a direct communication link 607, which can include an X2 communication link. Access nodes 610 and 611 can communicate control and data information across X2 communication link 607. In an exemplary embodiment, access node 611 includes logic to determine how to allocate data packets between access node 610 and access node 611, wherein the data packets flow between relay nodes 620, 630 and any external network node. Such logic may include a packet data convergence protocol (PDCP) function. Thus, RAN 601 can include a plurality of antenna elements (not shown herein) coupled to access nodes 610 and 611, with different antenna elements configured to deploy a different radio air interface using a different frequency.

Thus, the processing node within RAN 601 can be configured to prioritize resource allocation for relay nodes that have specific capabilities, e.g. capability for using a higher-bandwidth channel, such as 5G EN-DC, versus other relay nodes that do not have such capabilities. In particular when the RAN 601 is loaded (i.e. has limited wireless air interface resources available), preferentially allocating resources to more capable relay nodes ensures quality of service for end-user wireless devices attached to the more capable relay nodes. The bandwidth capability can be based on a channel bandwidth allocation for different relay nodes 620, 630, with the assumption that 5G or higher relay nodes will be able to utilize higher bandwidth channels. Resource grant allocations, such as uplink grant allocations, can be prioritized for the 5G-capable relay nodes over other relay nodes. The relay nodes 620, 630 (and capabilities thereof) can be identified based on a quality of service class identifier (QCI), a public land mobile identifier (PLMN) assignment, or equivalent attributes.

Figure 7:
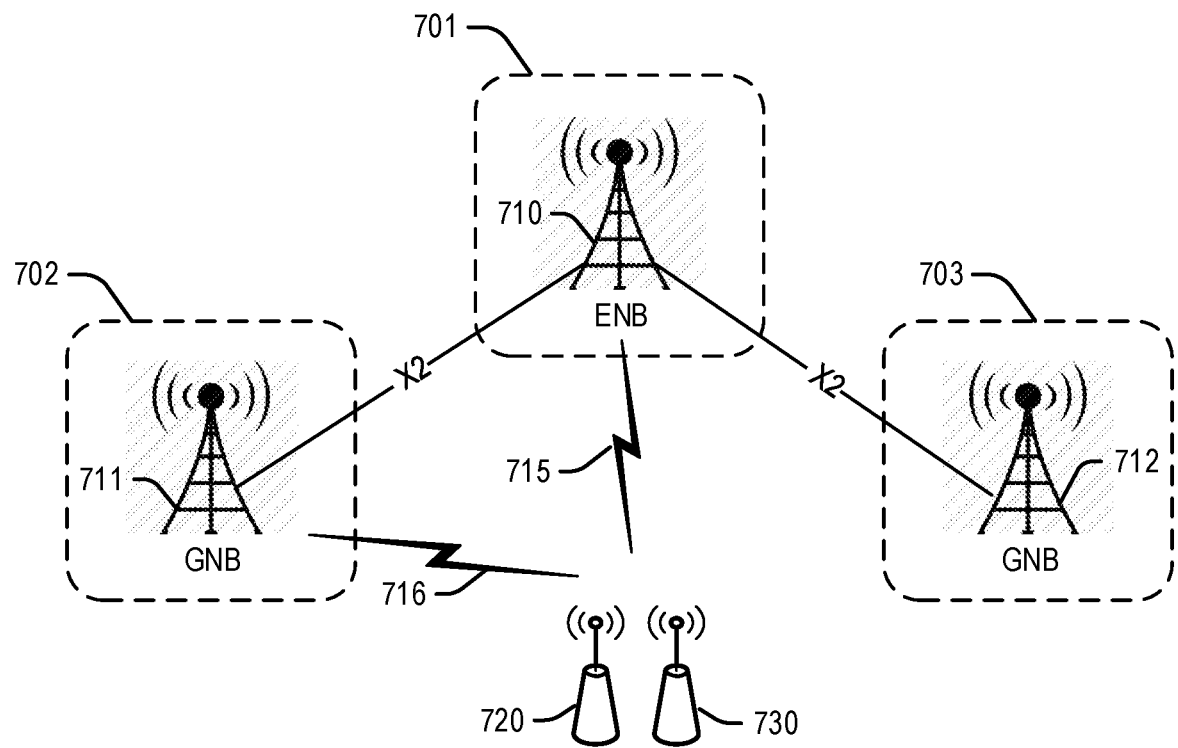
FIG. 7 depicts preferential resource allocation for relay nodes in an another exemplary 5G EN-DC radio access network.

FIG. 7 depicts exemplary resource allocation for relay nodes in another 5G EN-DC system. Each of RANs 701, 702, 703 includes at least access nodes 710, 711, 712 respectively. This embodiment depicts a one-to-many configuration, in which an eNodeB 710 is designated as a primary donor access node for wireless devices and relay nodes (such as relay node 720, 730), and one or more gNodeBs 711, 712 are selected as secondary donor access nodes, as further described below. Persons having ordinary skill in the art may note that other components may be included in any combination, without materially affecting the scope and spirit of the described embodiments.

In this exemplary embodiment, access node 710 can include a eNodeB, and access nodes 711, 712 can include gNodeBs. For example, access node 710 can be configured to deploy a wireless interface 715 using a first radio access technology (RAT), e.g. 4G LTE, and access nodes 711, 712 can be configured to deploy wireless interfaces using a second RAT, e.g. 5G NR. Further, access nodes 710, 711, 712 can be configured to communicate using both RATs at the same time. For example, dual connections can be set up with one or both of relay nodes 720, 730 using both 4G and 5G air interfaces respectively, the 4G wireless interface 715 being used to transmit control information, and one of the 5G wireless interfaces (e.g. 5G interface 716) being used to transmit data information. For example, a processing node communicatively coupled to access node 710 can be configured to determine whether or not relay nodes 720, 730 are capable of communicating using both RATs (e.g. capable of 5G EN-DC), and instruct the access node 710 to broadcast an indicator in, for example, a system information message. Responsive to the indicator, relay nodes 720, 730 can attach to access node 710 which can use the 4G carrier to control and set up a dual connectivity session with relay node 720, 730. Further, access node 710 can be configured to select one (or more) of access nodes 711, 712 as a secondary donor access node, to transport user data. In other words, control information (including SIB messages) is transmitted from the access node 710 using the 4G LTE air interface, while the 5G NR air interfaces (e.g. 5G NR air interface 716) is utilized for transmission of data. Further, access nodes 711 and 712 (hereinafter "secondary donor access nodes") can each be coupled to access node 710 (hereinafter "primary donor access node") via X2 communication links. In an exemplary embodiment, each secondary donor access node 711, 712 can include logic to determine how to allocate data packets between the donor access nodes, wherein the data packets flow between relay nodes 720, 730 and a network node not shown herein. Such logic may include a packet data convergence protocol (PDCP) function.

Further, a processing node communicatively coupled to any of access nodes 710, 711, 712 can be configured to allocate air interface resources to relay nodes 720, 730 by identifying relay nodes 720, 730 as being within range of one of donor access nodes 710-712, and preferentially allocating air interface resources to the relay nodes 720, 730 based on a bandwidth capability of each relay node 720, 730. The bandwidth capability can be associated with a capability of each relay node 720, 730 to participate in 4G LTE, 5G NR, or any other radio access technology (RAT). As described herein, the relay nodes 720, 730 may serve end-user wireless devices in a common coverage area. Identifying relay nodes 720, 730 further comprises receiving a resource request from each relay node 720, 730, and/or parsing attributes of each relay node, such as a QCI, primary cell identifier (PCI), PLMN ID, etc. Thus, upon receiving a first resource request from relay node 720 and a second resource request from relay node 730, air interface resources can be preferentially allocated to relay node 720 based on the higher bandwidth capability of relay node 720 relative to the lower bandwidth capability of relay node 730. Various other combinations of these operations may be envisioned by those having ordinary skill in the art in light of this disclosure, including the operations further described below with reference to FIGS. 8-11.

Figure 8:
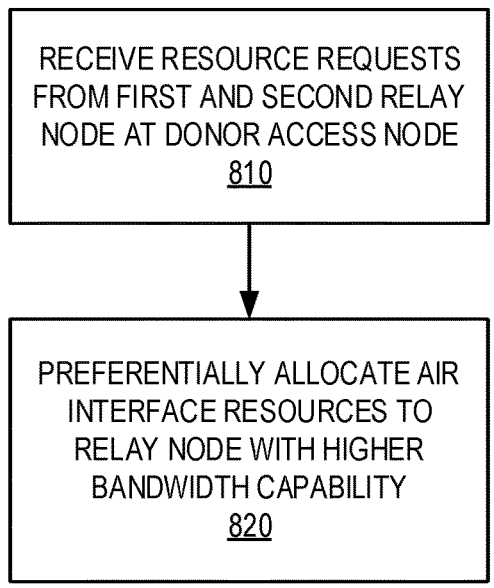
FIG. 8 depicts an exemplary method for allocating air interface resources to relay nodes in heterogeneous networks.

FIG. 8 depicts an exemplary method for allocating air interface resources to relay nodes in heterogeneous networks. The method of FIG. 8 may be implemented by a processing node communicatively coupled to one or more access nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, resource requests are received from first and second relay nodes at a donor access node. Multiple relay nodes with different capabilities may serve common geographical areas. For example, a 4G-capable relay node and a 5G-capable relay node within a geographic location may be available to the same end-user wireless devices, and served by the same donor access node. The relay nodes may utilize the same RAT while being capable of utilizing different bandwidths. An exemplary donor access node can include a combination of a 4G eNodeB and a 5G gNodeB. In other words, the donor access node can be configured to communicate using 4G LTE as well using 5G NR. In some embodiments, the donor access node can include a 4G eNodeB coupled to a plurality of 5G gNodeBs (one-to-many configuration). In similar embodiments, the donor access nodes can be selected from either the eNodeB or one of the 5G gNodeBs.

At 820, air interface resources are preferentially allocated to the relay node based on a bandwidth capability of each relay node. The bandwidth capability can be identified based on, for instance, parsing attributes of each relay node, such as a QCI, primary cell identifier (PCI), PLMN ID, etc., and referring to a database or other correlation of these identifiers with bandwidth capabilities. The bandwidth capability may be associated with a capability of each relay node to participate in 4G LTE, 5G NR, or any other radio access technology (RAT). Air interface resources are preferentially allocated to one of the first or second relay nodes based which relay node has a higher bandwidth capability.

Figure 9:
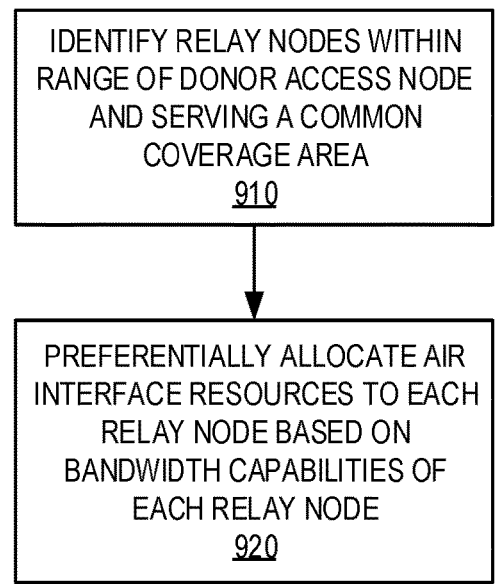
FIG. 9 depicts an exemplary method for allocating air interface resources to relay nodes in heterogeneous networks.

FIG. 9 depicts an exemplary method allocating air interface resources to relay nodes in heterogeneous networks. The method of FIG. 9 may be implemented by a processing node communicatively coupled to one or more access nodes, controller nodes, or any other network node. Although FIG. 9 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 910, relay nodes are identified within range of a donor access node. Further, multiple relay nodes with different capabilities may serve common geographical areas. For example, a 4G-capable relay node and a 5G-capable relay node within a geographic location may be available to the same end-user wireless devices, and served by the same donor access node. The relay nodes may utilize the same RAT while being capable of utilizing different bandwidths. An exemplary donor access node can include a combination of a 4G eNodeB and a 5G gNodeB. In other words, the donor access node can be configured to communicate using 4G LTE as well using 5G NR. In some embodiments, the donor access node can include a 4G eNodeB coupled to a plurality of 5G gNodeBs (one-to-many configuration). In similar embodiments, the donor access nodes can be selected from either the eNodeB or one of the 5G gNodeBs.

At 920, air interface resources are preferentially allocated to the relay node based on a bandwidth capability of each relay node. The bandwidth capability can be identified based on, for instance, parsing attributes of each relay node, such as a QCI, primary cell identifier (PCI), PLMN ID, etc., and referring to a database or other correlation of these identifiers with bandwidth capabilities. The bandwidth capability may be associated with a capability of each relay node to participate in 4G LTE, 5G NR, or any other radio access technology (RAT). Air interface resources are preferentially allocated to one of the first or second relay nodes based which relay node has a higher bandwidth capability.

Figure 10:
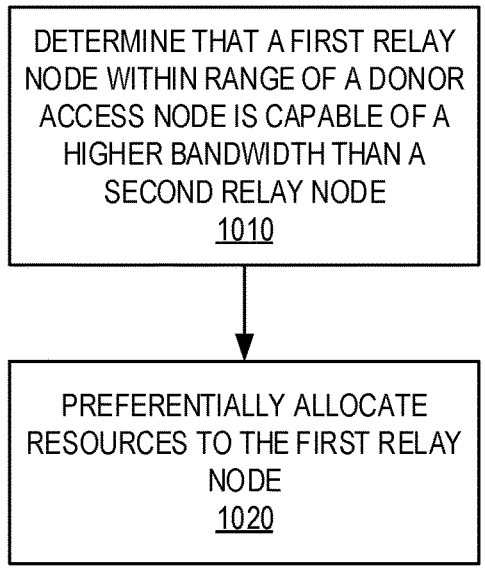
FIG. 10 depicts an exemplary method for allocating air interface resources to relay nodes in heterogeneous networks.

FIG. 10 depicts an exemplary method for allocating air interface resources to relay nodes in heterogeneous networks. The method of FIG. 10 may be implemented by a processing node communicatively coupled to one or more access nodes, controller nodes, or any other network node. Although FIG. 10 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 1010, it is determined that a first relay node within range of a donor access node is capable of a higher bandwidth than a second relay node. For example, a 4G-capable relay node and a 5G-capable relay node within a geographic location may be available to the same end-user wireless devices, and served by the same donor access node. The relay nodes may utilize the same RAT while being capable of utilizing different bandwidths. An exemplary donor access node can include a combination of a 4G eNodeB and a 5G gNodeB. In other words, the donor access node can be configured to communicate using 4G LTE as well using 5G NR. In some embodiments, the donor access node can include a 4G eNodeB coupled to a plurality of 5G gNodeBs (one-to-many configuration). In similar embodiments, the donor access nodes can be selected from either the eNodeB or one of the 5G gNodeBs.

At 1020, air interface resources are preferentially allocated to the first relay node based on the bandwidth capability of each relay node and/or the ability of the first relay node to utilize 5G. The bandwidth capability can be identified based on, for instance, parsing attributes of each relay node, such as a QCI, primary cell identifier (PCI), PLMN ID, etc., and referring to a database or other correlation of these identifiers with bandwidth capabilities. The bandwidth capability may be associated with a capability of each relay node to participate in 4G LTE, 5G NR, or any other radio access technology (RAT).

Figure 11:
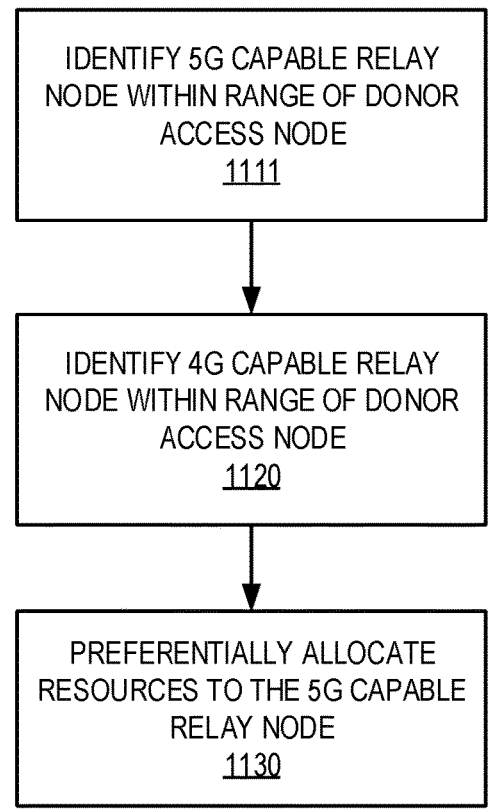
FIG. 11 depicts an exemplary method for allocating air interface resources to relay nodes in heterogeneous networks.

FIG. 11 depicts an exemplary method for allocating air interface resources to relay nodes in heterogeneous networks. The method of FIG. 11 may be implemented by a processing node communicatively coupled to one or more access nodes, controller nodes, or any other network node. Although FIG. 11 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 1111, a 5G-capable relay node is identified as being within range of a donor access node, and at 1120 a 4G-capable relay node is identified as being within range of the donor access node. The two relay notes may serve a common coverage area and may be available to the same end-user wireless devices, and served by the same donor access node. An exemplary donor access node can include a combination of a 4G eNodeB and a 5G gNodeB. In other words, the donor access node can be configured to communicate using 4G LTE as well using 5G NR. In some embodiments, the donor access node can include a 4G eNodeB coupled to a plurality of 5G gNodeBs (one-to-many configuration). In similar embodiments, the donor access nodes can be selected from either the eNodeB or one of the 5G gNodeBs.

At 1130, air interface resources are preferentially allocated to the 5G-capable relay node based on the increased bandwidth capability of the 5G-capable relay node and/or the ability of the relay node to utilize 5G. The 5G capability can be identified based on, for instance, parsing attributes of each relay node, such as a QCI, primary cell identifier (PCI), PLMN ID, etc., and referring to a database or other correlation of these identifiers with bandwidth capabilities. The bandwidth capability may be associated with a capability of each relay node to participate in 4G LTE, 5G NR, or any other radio access technology (RAT).

Further, while 4G LTE and 5G NR are described in the above embodiments, the disclosed operations may apply to different combinations of radio air interfaces, including any combination of radio air interfaces within the same or different radio-access technologies, such as multiple different 4G carriers with different bandwidths, 5G carriers with different bandwidths, or any future wireless technology. So long as the described allocations of resources for relay nodes with different bandwidth capabilities is performed as described herein, the specific implementation and network topology is less relevant.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for allocating air interface resources to relay nodes in heterogeneous networks, the method comprising:
   identifying two or more relay nodes within range of a donor access node configured to participate in dual connectivity by utilizing at least a fourth generation (4G) RAT wireless air interface and a fifth generation (5G) radio access technology (RAT) wireless air interface;
   parsing attributes of each relay node to identify a bandwidth capability of each relay node; and
   preferentially allocating air interface resources to the two or more relay nodes based on the bandwidth capability of each relay node to serve wireless devices in a common coverage area of the relay nodes;
   wherein the bandwidth capability is associated with a RAT utilized by each relay node, and
   wherein the air interface resources are preferentially allocated to a first relay node using the 5G RAT over a second relay node using the 4G RAT at least by prioritizing uplink grant allocations to the first relay node over the second relay node.

2. The method of claim 1, wherein the relay nodes serve the common coverage area.

3. The method of claim 1, wherein identifying the two or more relay nodes comprises receiving a resource request from each relay node.

4. The method of claim 3, further comprising identifying each relay node based on a unique identifier associated with each relay node, the unique identifier comprising at least one of a public land mobile number (PLMN), a primary cell identifier (PCI), or a quality of service control identifier (QCI).

5. The method of claim 1, wherein the bandwidth capability is based on different bandwidths within a single RAT.

6. The method of claim 1, wherein the donor access node comprises a primary access node configured to deploy carriers utilizing the first RAT, the primary access node is coupled to one or more secondary access nodes, each secondary access node configured to deploy carriers utilizing the second RAT.

7. The method of claim 1, wherein the donor access node comprises a secondary access node configured to deploy carriers utilizing the second RAT, the secondary access node being coupled to a primary access node configured to deploy carriers utilizing the first RAT.

8. The method of claim 1, wherein the air interface resources are preferentially allocated by a scheduler coupled to a primary donor access node.

9. The method of claim 1, wherein the air interface resources are preferentially allocated by a scheduler coupled to a secondary donor access node.

10. A method for allocating air interface resources to relay nodes in heterogeneous networks, the method comprising:
    receiving, at a donor access node configured to participate in dual connectivity by utilizing at least a fourth generation (4G) RAT wireless air interface and a fifth generation (5G) radio access technology (RAT) wireless air interface, a first resource request from a first relay node utilizing a fourth generation (4G) radio access technology (RAT);
    receiving at the donor access node a second resource request from a second relay node utilizing a fifth generation (5G) RAT; and
    preferentially allocating air interface resources to the second relay node based on the 5G RAT utilizing a higher bandwidth capability than the 4G RAT at least by prioritizing uplink grant allocations to the second relay node over the first relay node to serve wireless devices in a common coverage area of the relay nodes.

11. The method of claim 10, wherein each relay node serves the common coverage area.

12. A system for allocating air interface resources to relay nodes in heterogeneous networks, the system comprising:
    a donor access node configured to participate in dual connectivity by utilizing at least a fourth generation (4G) RAT wireless air interface and a fifth generation (5G) radio access technology (RAT) wireless air interface;
    a first relay node configured to utilize a fifth generation (5G) radio access technology (RAT) with a first channel bandwidth;
    a second relay node configured to utilize a fourth generation (4G) RAT with a second channel bandwidth, the second channel bandwidth being smaller than the first channel bandwidth; and
    a processing node communicatively coupled to the donor access node, the processing node configured to perform operations comprising:
    receiving connection requests from the first and second relay nodes; and
    preferentially allocating air interface resources to the first relay node over the second relay node based on the second channel bandwidth being smaller than the first channel bandwidth at least by prioritizing uplink grant allocations to the first relay node to serve wireless devices in a common coverage area of the relay nodes.

13. The system of claim 12, wherein the donor access node comprises a primary access node configured to deploy carriers utilizing the second channel bandwidth, the primary access node is coupled to one or more secondary access nodes, each secondary access node configured to deploy carriers utilizing the first channel bandwidth.

14. The system of claim 12, wherein the donor access node comprises a secondary access node configured to deploy carriers utilizing the first channel bandwidth, the secondary access node being coupled to a primary access node configured to deploy carriers utilizing the second channel bandwidth.

15. The system of claim 12, wherein the air interface resources are associated with the first channel bandwidth.

16. The system of claim 12, wherein the air interface resources are associated with the second channel bandwidth.

\* \* \* \* \*